United States Patent
Hwang et al.

(10) Patent No.: US 12,332,788 B2
(45) Date of Patent: *Jun. 17, 2025

(54) SYSTEM SETTING INCLUDING OPERATING FREQUENCY OF RANDOM ACCESS MEMORY BASED ON CACHE HIT RATIO AND OPERATING METHOD THEREOF

(71) Applicant: SK hynix Inc., Icheon-si (KR)

(72) Inventors: Yong Wan Hwang, Icheon-si (KR); Nam Hyeok Jeong, Icheon-si (KR); Kwang Ho Choi, Icheon-si (KR); Moon Hyeok Choi, Icheon-si (KR); Tae Woong Ha, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,115

(22) Filed: Jan. 19, 2024

(65) Prior Publication Data

US 2024/0152456 A1    May 9, 2024

Related U.S. Application Data

(63) Continuation of application No. 17/572,965, filed on Jan. 11, 2022, now Pat. No. 11,899,584.

(30) Foreign Application Priority Data

Jul. 14, 2021    (KR) ......................... 10-2021-0092009

(51) Int. Cl.
| | | |
|---|---|---|
| *G06F 12/08* | (2016.01) | |
| *G06F 12/0811* | (2016.01) | |
| *G06F 12/0831* | (2016.01) | |
| *G06F 13/16* | (2006.01) | |

(52) U.S. Cl.
CPC ...... *G06F 12/0811* (2013.01); *G06F 12/0833* (2013.01); *G06F 13/1689* (2013.01); *G06F 2212/1021* (2013.01)

(58) Field of Classification Search
CPC ............. G06F 12/0811; G06F 12/0833; G06F 13/1689; G06F 2212/1021
See application file for complete search history.

(56) References Cited

U.S. PATENT DOCUMENTS

| | | | |
|---|---|---|---|
| 2013/0191587 A1* | 7/2013 | Torii | G06F 12/0884 711/105 |
| 2017/0277460 A1* | 9/2017 | Li | G06F 1/3275 |
| 2023/0013288 A1 | 1/2023 | Hwang et al. | |

FOREIGN PATENT DOCUMENTS

| | | |
|---|---|---|
| KR | 20190002248 A | 1/2019 |
| KR | 20190029657 A | 3/2019 |

* cited by examiner

*Primary Examiner* — Masud K Khan
(74) *Attorney, Agent, or Firm* — Perkins Cole LLP

(57) ABSTRACT

Embodiments of the present disclosure relate to a system and an operating method of the system. Based on some embodiments of the disclosed technology, the system may include a random access memory structured to include memory cells to store data, a cache memory configured to cache at least part of the data, and a processor in communication with the random access memory and the cache memory to access at least part of the data from the random access memory or cache memory. The system may determine a cache hit ratio for the cache memory, and may set an operating frequency of the random access memory based on the cache hit ratio.

12 Claims, 14 Drawing Sheets

$(CHR) = (CHR\_L1) + (1 - (CHR\_L1)) * (CHR\_L2)$

SYSTEM SETTING INCLUDING OPERATING FREQUENCY OF RANDOM ACCESS MEMORY BASED ON CACHE HIT RATIO AND OPERATING METHOD THEREOF

CROSS-REFERENCE TO RELATED APPLICATION

The present document is a continuation of, and claims the priority and benefits of, U.S. patent application Ser. No. 17/572,965, filed on Jan. 11, 2022, which claims the priority and benefits of Korean patent application No. 10-2021-0092009 filed on Jul. 14, 2021. The entire contents of the above applications are incorporated herein by reference in their entities as part of the disclosure of this patent document.

TECHNICAL FIELD

The embodiments of the disclosed technology relate to a system setting including operating frequency of random access memory based on cache hit ratio and an operating method of the system.

BACKGROUND

A memory system includes a data storage device that stores data on the basis of a request from a host, such as a computer, servers, a smartphone, a tablet PC, or other devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

A system is an interconnection of devices that perform specific operations. Such a system may include a memory device for storing data based on a request from a host such as a computer, a mobile terminal such as a smart phone or a tablet, or various devices. Systems may store data in a magnetic disk (e.g., hard disk drive (HDD)), or in a semiconductor memory device such as volatile memory or non-volatile memory (e.g., solid state drives (SSDs), universal flash storage (UFS) devices, embedded MMC (eMMC) devices).

In performing logical operations and controlling various operations associated with the devices, the systems may store data in internal random access memory devices or external random access memory devices and access such random access memory devices to read out the data.

SUMMARY

The technology disclosed in this patent document can be implemented in various embodiments to provide systems and operating methods of the systems that can reduce the power consumption of random access memory devices while minimizing the performance degradation.

In one aspect, embodiments of the disclosure may provide a system including a random access memory structured to include memory cells to store data, a cache memory configured to cache at least part of the data, and a processor in communication with the random access memory and the cache memory to access at least part of the data in the random access memory or the cache memory.

The processor may determine a cache hit ratio for the cache memory, and set an operating frequency of the random access memory based on the cache hit ratio for the cache memory.

For example, the system may determine a size of data in the random access memory based on 1) a size of data in the random access memory or the cache memory that is accessed by the processor, and 2) the cache hit ratio for the cache memory.

In addition, the system may set the operating frequency of the random access memory based on the size of the data in the random access memory that is accessed by the processor.

In another aspect, embodiments of the disclosure may provide an operating method of a system.

The operating method of a system may include determining a cache hit ratio for the cache memory configured to cache at least part of data that is to be stored in a random access memory.

The operating method of a system may include setting an operating frequency of the random access memory based on the cache hit ratio for the cache memory.

As an example, the setting of the operating frequency of the random access memory based on the cache hit ratio for the cache memory may include determining a size of accessed data in the random access memory based on 1) a size of accessed data in the random access memory or the cache memory and 2) the cache hit ratio for the cache memory.

In addition, the setting of the operating frequency of the random access memory based on the cache hit ratio for the cache memory may include setting the operating frequency of the random access memory based on the size of the accessed data in the random access memory.

In one aspect, embodiments of the disclosure may provide a system including a random access memory for storing data, a cache for caching a part of the data, and a processor for to accessing a part of the data from the random access memory or the cache.

The system may determine a cache hit ratio for the cache, and set an operating frequency of the random access memory based on the cache hit ratio for the cache.

For example, the system may determine a size of data accessed by the processor from the random access memory based on 1) a size of the data accessed by the processor from the random access memory or the cache, and 2) the cache hit ratio for the cache.

In addition, the system may set the operating frequency of the random access memory based on the size of the data accessed by the processor from the random access memory.

In another aspect, embodiments of the disclosure may provide an operating method of a system including a random access memory for storing data, a cache for caching a part of the data, and a processor configured to access a part of the data from the random access memory or the cache.

The operating method of a system may include determining a cache hit ratio for the cache.

The operating method of a system may include setting an operating frequency of the random access memory based on the cache hit ratio for the cache.

As an example, the setting the operating frequency of the random access memory based on the cache hit ratio for the cache may include determining a size of data accessed by the processor from the random access memory based on 1) a size of the data accessed by the processor from the random access memory or the cache and 2) the cache hit ratio for the cache.

In addition, the setting the operating frequency of the random access memory based on the cache hit ratio for the cache may include setting the operating frequency of the random access memory based on the size of the data accessed by the processor from the random access memory.

The disclosed technology can be implemented in some embodiments to reduce the power consumption of a random access memory while minimizing its performance degradation.

DETAILED DESCRIPTION

Figure 1:
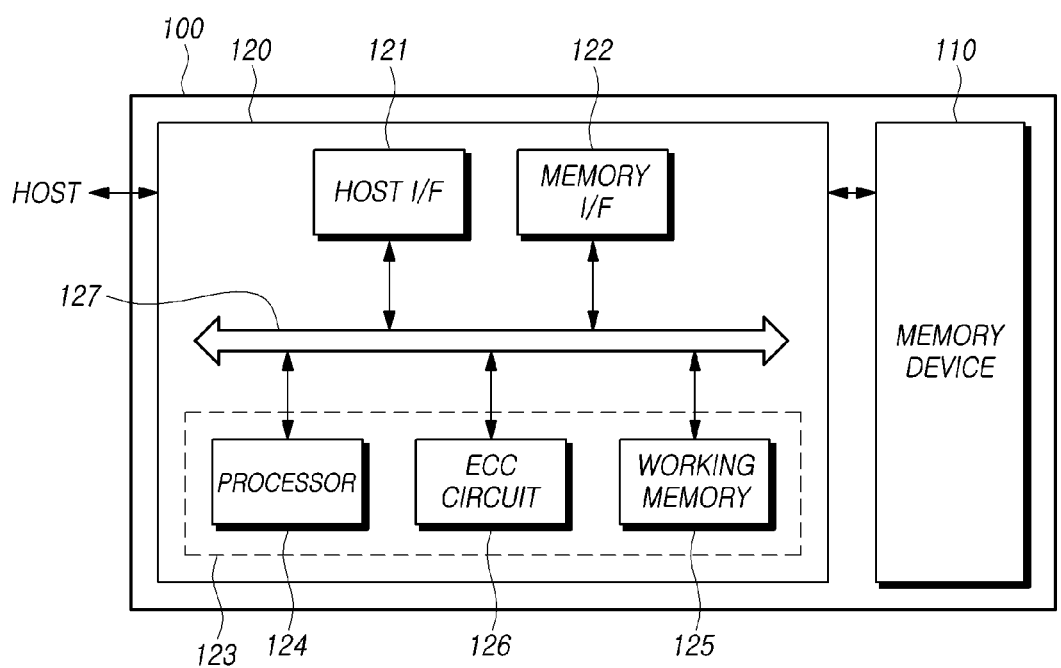
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the technology disclosed in the present disclosure are described below in more detail with reference to the accompanying drawings. We note, however, that the disclosed technology may be embodied in different forms and variations, and should not be construed as being limited to the embodiments set forth herein. Rather, the described embodiments are provided as examples and variations of the disclosed embodiments and other embodiments can be made based on what is disclosed. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the operations performed by the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), and an erasure operation.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
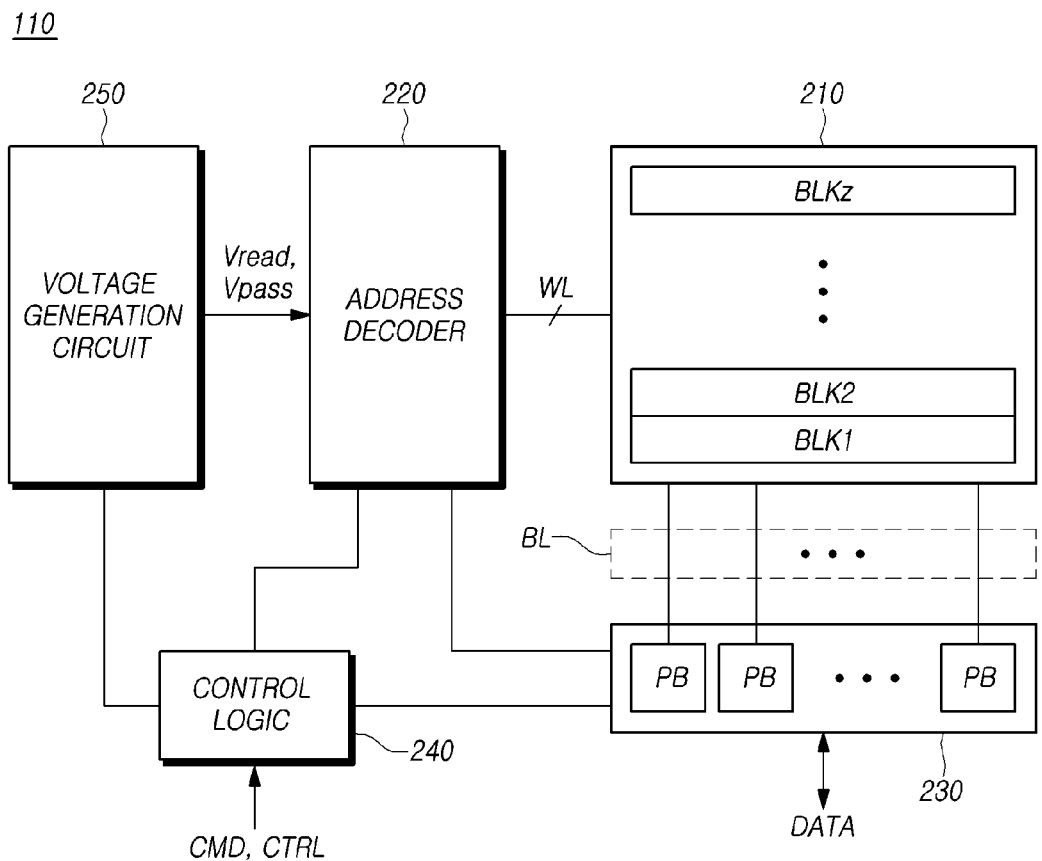
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
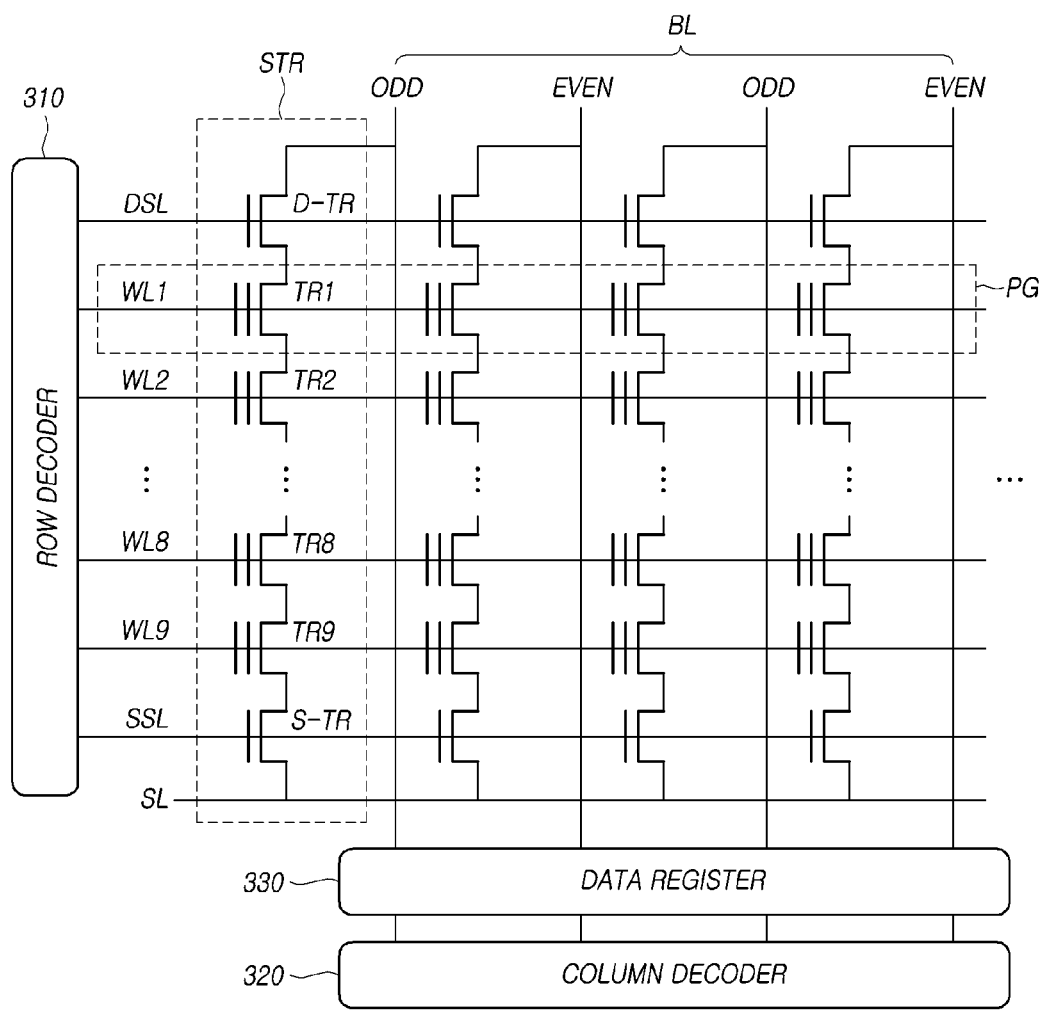
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
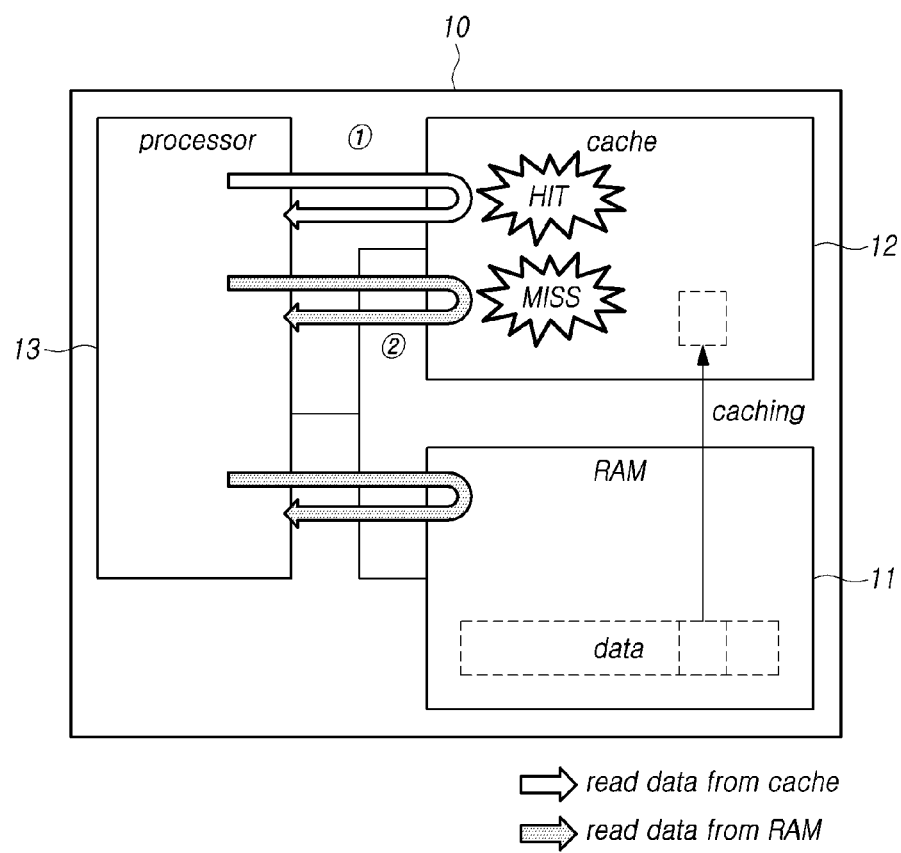
FIG. 4 illustrates an example configuration of an system based on some embodiments of the disclosed technology.

FIG. 4 illustrates an example configuration of a system 10 based on some embodiments of the disclosed technology.

Referring to FIG. 4, a system 10 (hereinafter "system") may include a random access memory 11, a cache or cache memory 12 and a processor 13 that are coupled to be in communication with one another as shown in the example in FIG. 4.

The random access memory 11 may store data. In some implementations, the random access memory 11 may be used to store the programs and data being used by the processor 13. In one example, the data stored in the random access memory 11 may include data loaded from a data storage device or another memory device (e.g., NAND flash memory, NOR flash memory, PRAM, MRAM, STT-RAM) located inside or outside the system 10, or data being created and/or used to perform logical operations by the processor 13.

In some implementations, the cache 12 may cache part of the data stored in the random access memory 11. In one example, the cache 12 may include a memory (e.g., SRAM, TCM) that operates at a higher speed than the random access memory 11 and has a smaller storage capacity than the random access memory 11. In addition, the system 10 may determine, based on a dirty bit, as to whether the data cached in the cache 12 has changed, thereby preventing a potential data mismatch between the cache 12 and the random access memory 11. Here, the dirty bit may include a bit that is associated with a part of the cache 12 and indicates whether or not the corresponding part of the cache 12 has been modified.

In some implementations, the processor 13 may access part of the data stored in the random access memory 11 from the random access memory 11 or the cache 12.

As an example, the processor 13 may access the data from the cache 12 when the data to be accessed is cached in the cache 12 and is successfully read out from the cache 12 (i.e., when a "cache hit" occurs), as labeled with "①" in FIG. 4. On the other hand, the processor 13 may attempt to access certain data from the cache 12 but that certain data is not available in the cache 12 (i.e., when a "cache miss" occurs) as labeled with "②" in FIG. 4. When such cache miss occurs, the processor 13 may next access the certain data from the random access memory 11.

The system 10 based on some embodiments of the disclosed technology may be implemented in various ways. As an example, the system 10 may be implemented as the memory system 100 described with reference to FIG. 1.

In some implementations, the processor 13 may include the processor 124 described with reference to FIG. 1. The random access memory 11 may include the working memory 125 described with reference to FIG. 1. The cache 12 may include a volatile memory arranged in the processor 124 or the working memory 125 described with reference to FIG. 1 or any other memory device.

In some implementations, the above-described system 10 can be operated as will be discussed below. As an example, the operations of the system 10 described below may be executed through the processor 13 or may be executed through a separate arithmetic circuit included in the system 10.

Figure 5:
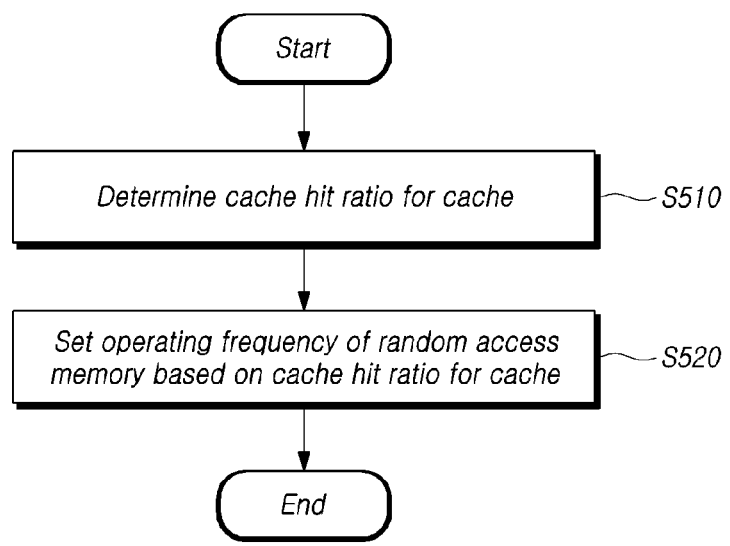
FIG. 5 is a flowchart illustrating an example operation of an system based on some embodiments of the disclosed technology.

FIG. 5 is a flowchart illustrating an example operation of the system 10 in FIG. 4 based on some embodiments of the disclosed technology.

Referring to FIG. 5, the processor 13 of the system 10 may determine a cache hit ratio for the cache 12 (S510) based on its operation of retrieving data from the cache 12. In some implementations, the cache hit ratio can include a measurement of how many content requests a cache can deliver successfully from its cache storage, compared to how many requests it receives.

In some implementations, at S520, the processor 13 of the system 10 may set an operating frequency of a random access memory 11 based on the cache hit ratio for the cache 12 determined at S510. The operating frequency of the random access memory 11 may indicate the frequency of a clock that is fed or input into the random access memory 11.

That is, the processor 13 of the system 10 may dynamically update or change the operating frequency of the random access memory 11 according to the cache hit ratio for the cache 12, instead of maintaining the operating frequency of the random access memory 11 at a fixed value.

As explained below, the system 10 may be configured to set the operating frequency of the random access memory 11 based on the cache hit ratio for the cache 12 in certain circumstances shown by the specific examples below.

In some implementations, the operating frequency of the random access memory 11 may be set to an operating frequency that supports the maximum performance of the random access memory 11 regardless of the frequency of use of the random access memory 11.

However, in the case that the operating frequency of the random access memory 11 is fixed to an operating frequency supporting the maximum performance of the random access memory 11, the random access memory 11 would operate at a high operating frequency even when the frequency at which the processor 13 accesses the random access memory 11 is low. In this case, it is difficult to maximize the performance of the random access memory 11 even at a high operating frequency.

On the other hand, the high operating frequency of the random access memory 11 during the period when it is not accessed by the processor 13 may unnecessarily increase the power consumption of the random access memory 11 because the operating frequency is one of the key components to determining the power consumption.

The disclosed technology can be implemented in some embodiments to determine an optimal value for the operating frequency of the random access memory 11 based on the frequency of access to the random access memory 11 by the processor 13.

The frequency of access to the random access memory 11 by the processor 13 may decrease as the frequency of access to the cache 12 by the processor 13 increases. In the case that the processor 13 can read data from the cache 12, the performance of the processor 13 may be improved since the processor 13 can avoid accessing the random access memory 11, which is operating at a slower speed than the cache 12.

Accordingly, the systems implemented based on some embodiments of the disclosed technology can improve its performance by adjusting the operating frequency of the random access memory 11 based on the cache hit ratio, which indicates the frequency of access to the cache 12 for data by the processor 13, thereby preventing unnecessary power consumption when the frequency of access to the random access memory 11 is low. In addition, when the frequency of access to the random access memory 11 is high, the processor 13 may increase the operating frequency of the random access memory 11 to prevent potential performance degradation.

In some implementations, the cache hit ratio of the cache 12 is used to determine the operating frequency of the random access memory 11 as will be discussed below.

Figure 6:
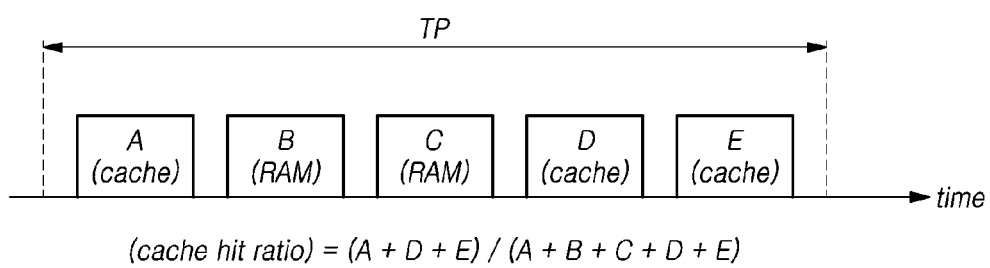
FIG. 6 illustrates an example method for a system to determine a cache hit ratio of a cache based on some embodiments of the disclosed technology.

FIG. 6 illustrates an example method for a system 10 to determine a cache hit ratio of a cache 12 based on some embodiments of the disclosed technology.

In an implementation, the system 10 may determine the cache hit ratio for the cache based on the ratio of a size of the data in the cache that is accessed by the processor 13 during a certain time period TP to a total size of the data in the random access memory 11 or the cache 12 that is accessed by the processor 13 during the certain time period TP. In another implementation, the cache hit ratio can be determined based the ratio of the number of requests handled by the cache 12 to the total number of requests handled by the random access memory 11 or the cache 12.

The processor 13 may first check to see if the data requested (the data to be accessed) is stored in the cache 12. If the corresponding data is stored in the cache 12, the processor 13 may access the cache 12 to read out the data. If the corresponding data is not stored in the cache 12, the processor 13 may access the random access memory 11 to read out the data.

In some implementations, the total size of the data accessed by the processor 13 from the random access memory 11 or the cache 12 during the certain time period TP may be referred to as a total bandwidth for the data accessed by the processor 13.

In FIG. 6, the sizes of data in the cache 12 that is accessed by the system 10 during a certain time period TP are A, D, and E, and the sizes of data in the random access memory 11 accessed by the system 10 during the certain time period TP are B and C.

In this example, the cache hit ratio of the cache 12 may be $(A+D+E)/(A+B+C+D+E)$, which is the ratio of the size $(A+D+E)$ of data from cache 12 to the total size $(A+B+C+D+E)$ of data from the random access memory 11 or the cache 12 that are accessed during a certain time period TP.

As another example, in the case that the size of the data accessed by the system 10 at one time from the cache 12 is fixed, the system 10 may use the number of accesses to the cache 12 and the random access memory 11 during a certain time period TP to determine the cache hit ratio. That is, the system 10 may determine the cache hit ratio of the cache 12 based on the number of accesses to data in the cache 12 to a total number of accesses to data in the random access memory 11 or the cache 12 during a certain time period TP.

As another example, the system 10 may determine the cache hit ratio of the cache 12 based on the number of accesses to data in the cache 12 to a total number of data retrieves from the cache 12 during a certain time period TP.

Figure 7:
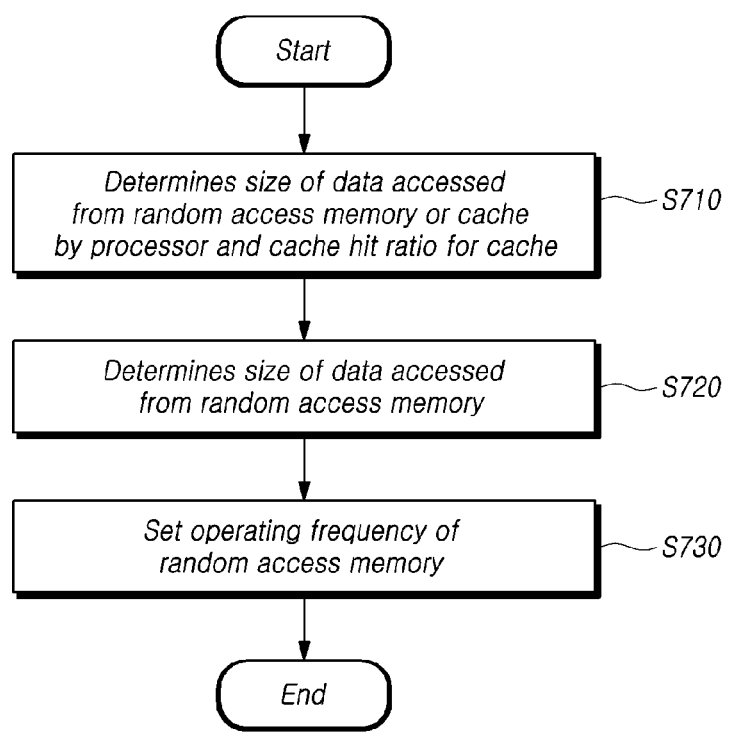
FIG. 7 is a flowchart illustrating an example of how a system based on some embodiments of the disclosed technology sets an operating frequency of a random access memory.

FIG. 7 is a flowchart illustrating an example of how a system 10 based on some embodiments of the disclosed technology sets an operating frequency of a random access memory.

Referring to FIG. 7, the system 10 may determine: (1) the size of the data in the random access memory 11 or the cache 12 that is accessed by the processor 13; and (2) the cache hit ratio for the cache 12. In this example, the size of the data in the random access memory 11 or the cache 12 that is accessed by the processor 13 may be a size of the data in the random access memory 11 or the cache 12 that is accessed by the processor during a time period equal to a predetermined time period used to determine the cache hit ratio for the cache 12.

In addition, the system 10 may determine the size of the data in the random access memory 11 that is accessed by the processor 13 based on: (1) the size of the data in the random access memory 11 or cache 12 that is accessed by the processor 13; and (2) the cache hit ratio for the cache 12 determined at S710.

As an example, the size of the data in the cache 12 that is accessed by the processor 13 may be determined by the product of: (1) the size of the data in the random access memory 11 or cache 12 that is accessed by the processor 13; and (2) the cache hit ratio for the cache 12. In addition, the size of the data in the random access memory 11 that is accessed by the processor 13 may be obtained by subtracting the size of the data in the cache 12 that accessed by the processor 13 from the size of the data in the random access memory 11 or cache 12 that is accessed by the processor 13.

The system 10 may set the operating frequency of the random access memory 11 based on the size of the data in the random access memory 11 that accessed by the processor 13 (S730).

As discussed above, the system 10 can set the operating frequency of the random access memory 11 based on the cache hit ratio for the cache 12.

In some implementations, the setting of the operating frequency of the random access memory 11 in a specific cache 12 structure.

Figure 8:
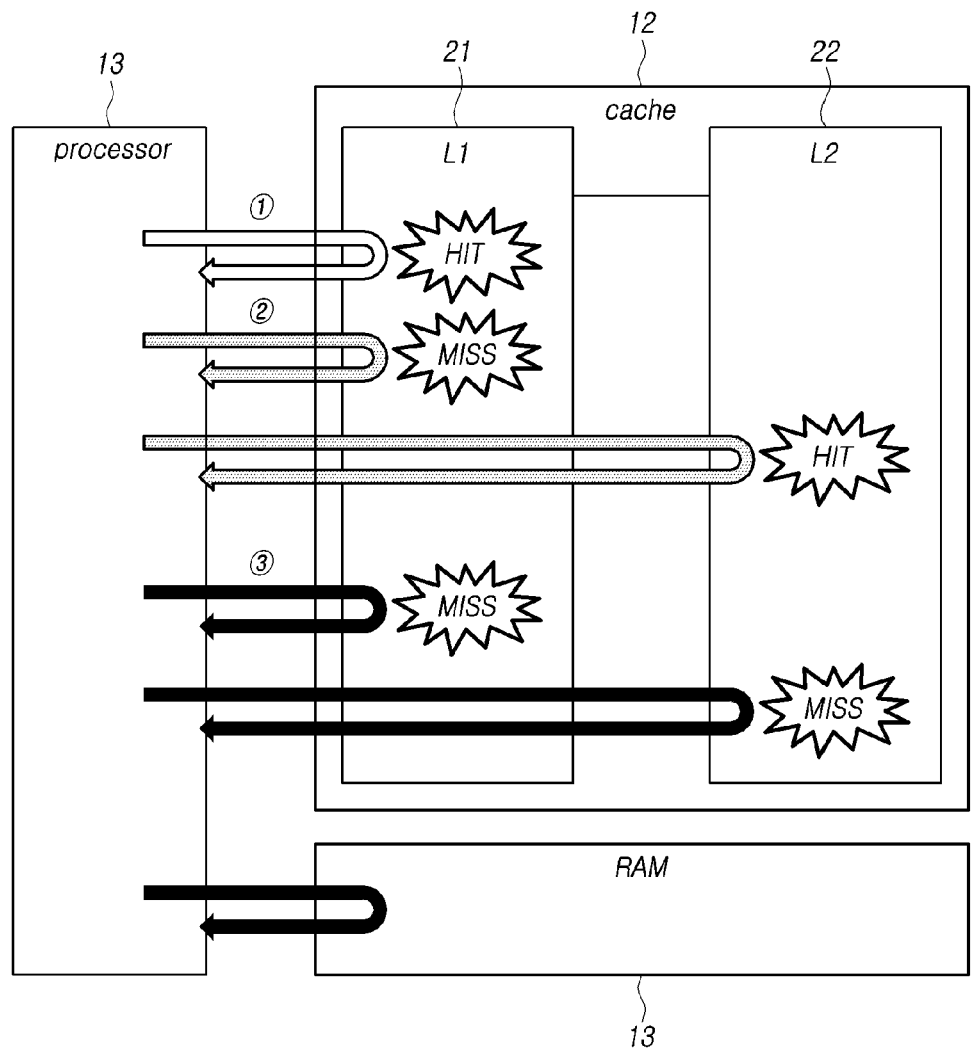
FIG. 8 illustrates an example configuration of a cache based on some embodiments of the disclosed technology.

FIG. 8 illustrates an example configuration of a cache 12 based on some embodiments of the disclosed technology.

Referring to FIG. 8, the cache 12 may include an L1 cache 21 and an L2 cache 22. In this case, the L1 cache 21 may operate at a higher speed than the L2 cache 22, and may have a smaller storage capacity than the L2 cache 22.

In FIG. 8, the processor 13 may first search the L1 cache 21 to determine whether the data to be accessed is stored in the cache 12.

The processor 13 may access data stored in the L1 cache 21 in the case that a cache hit occurs in the L1 cache 21 as labeled with "①" in FIG. 8.

If the data to be accessed is not stored in the L1 cache 21 (that is, if a cache miss occurs in the L1 cache 21), the processor 13 may access the L2 cache 22. If the data to be accessed is stored in the L2 cache 22 (that is, if a cache hit occurs in the L2 cache 22), the processor 13 may access the data in the L2 cache 22 as labeled with "②" in FIG. 8.

If the data to be accessed is not stored in the L1 cache 21 nor in the L2 cache 22 (that is, if a cache miss occurs in both the L1 cache 21 and the L2 cache 22), the processor 13 may access data that is stored in the random access memory 11 as labeled with "③" in FIG. 8.

In this case, the system 10 may determine that the cache 12 has been hit in the case of "①" and "②" described above.

Hereinafter, it will be described an operation of determining whether a cache hit with respect to the cache 12 when the cache 12 determines the L1 cache 21 and the L2 cache 22.

Figure 9:
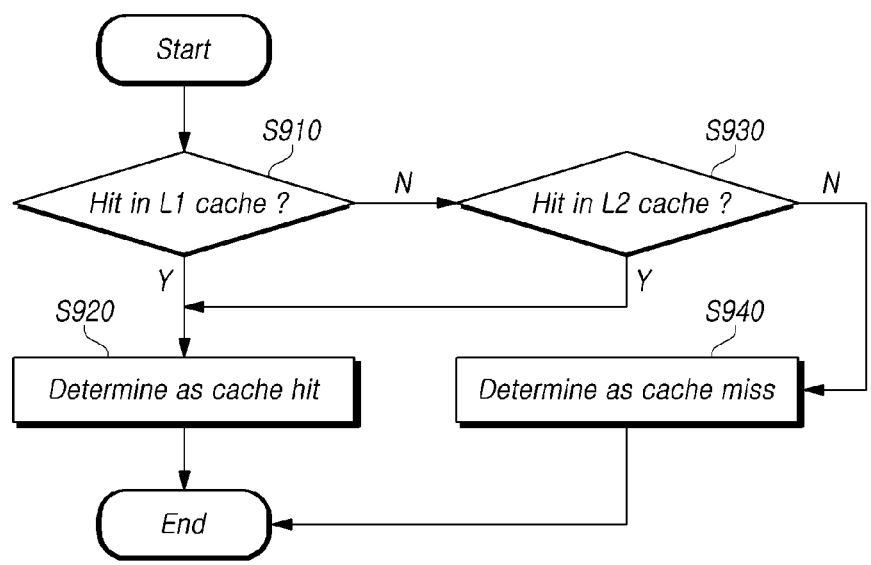
FIG. 9 is a flowchart illustrating an example of a determination operation as to whether or not a cache hit for the cache described in FIG. 8.

FIG. 9 is a flowchart illustrating an example of a determination operation as to whether or not a cache hit for the cache 12 described in FIG. 8.

Referring to FIG. 9, the processor 13 of the system 10 determines whether an L1 cache 21 (S910) is hit (e.g., whether the data to be accessed is in the L1 cache 21).

If the data to be accessed is hit in the L1 cache 21 (e.g., if the data to be accessed is in the L1 cache 21) (S910—Y), the processor 13 may determine the cache 12 is hit (S920).

On the other hand, if the data to be accessed is not hit in the L1 cache 21 (e.g., the data to be accessed does not exist in the L1 cache 21) (S910—N), the processor 13 determines whether the data to be accessed is hit in the L2 cache 22 (S930).

If the data to be accessed is hit in the L2 cache 22 (S930—Y), the processor 13 may determine that the cache 12 is hit (S920).

In the case that the data to be accessed is not hit in the L2 cache 22 (S930—N), the processor 13 may determine that the cache 12 is missed (S940).

When the processor 13 determines whether a cache hit occurs for the cache 12 according to the operation described in FIG. 9, the cache hit ratio CHR for the cache 12 may be determined according to Eq. 1 below based on a cache hit ratio CHR_L1 for the L1 cache 21 and a cache hit ratio CHR_L2 for the L2 cache 22.

In some implementations, the cache hit ratio CHR_L1 for the L1 cache 21 and the cache hit ratio CHR_L2 for the L2 cache 22 may be determined in the same manner as the above-described method for determining the cache hit ratio of the cache 12.

For example, the cache hit ratio CHR_L1 for the L1 cache 21 may be determined as, during a predetermined time period, (1) a ratio of a size of the data in the L1 cache 21 that is accessed by the processor 13 to a total size of the data in the random access memory 11 or the cache 12 that is accessed by the processor 13; (2) a ratio of the number of data accesses to the L1 cache 21 by the processor 13 to a total number of data accesses to the random access memory 11 or the cache 12 by the processor 13; or (3) a ratio of the number of data accesses to the L1 cache 21 by the processor 13 to a total number of data accesses to the L1 cache 21 by the processor 13.

For example, the cache hit ratio CHR_L2 for the L2 cache 22 may be determined as: during a predetermined time period, (1) a ratio of a size of the data in the L2 cache 22 that is accessed by the processor 13 to a total size of the data in the random access memory 11 or the cache 12 that is accessed by the processor 13; (2) a ratio of the number of data accesses to the L2 cache 22 by the processor 13 to a total number of data accesses to the random access memory 11 or the cache 12 by the processor 13; or (3) a ratio of the number of data accesses to the L2 cache 22 by the processor 13 to a total number of data accesses to the L2 cache 22 by the processor 13.

$$(CHR) = (CHR\_L1) + (1 - (CHR\_L1)) * (CHR\_L2) \qquad \text{(Eq. 1)}$$

In this case, with respect to the total size DS_TOTAL of the data in the random access memory 11 or the cache 12 that is accessed by the processor 13, the size of the data in the cache that is accessed by the processor 13 may be determined by:

$$(DS\_TOTAL) * (CHR) = (DS\_TOTAL) * (CHR\_L1) + (DS\_TOTAL) * (1 - (CHR\_L1)) * (CHR\_L2).$$

Accordingly, the size DS_RAM of data in the random access memory 11 that is accessed by the processor 13, which is a value obtained by subtracting the size (DS_TOTAL)*(CHR) of data accessed by the processor 13 from the cache from the total size DS_TOTAL of data accessed by the processor 13 from the random access memory 11 or cache 12.

$$(DS\_RAM)=(DS\_TOTAL)-(DS\_TOTAL)*(CHR)= \\ (DS\_TOTAL)-(DS\_TOTAL)*(CHR\_L1)- \\ (DS\_TOTAL)*(1-(CHR\_L1))*(CHR\_L2) \quad (Eq. 2)$$

Figure 10:
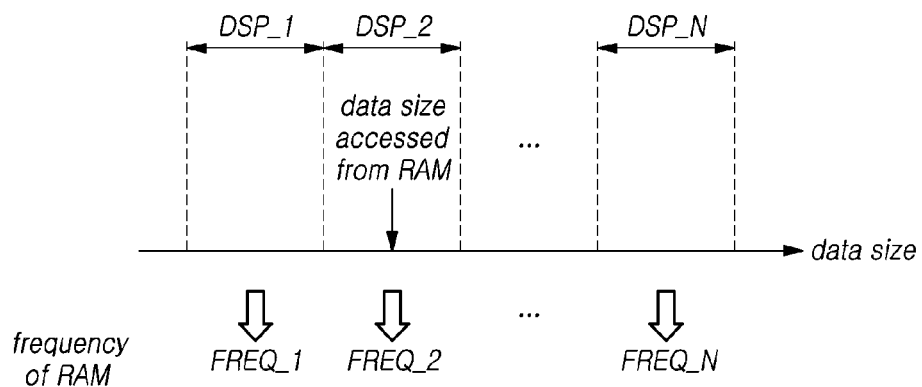
FIG. 10 illustrates an example method for a system to set an operating frequency of a random access memory based on some embodiments of the disclosed technology.

FIG. 10 illustrates an example method for a system 10 to set an operating frequency of a random access memory 11 based on some embodiments of the disclosed technology.

Referring to FIG. 10, the system 10 may set N data size periods DSP_1, DSP_2, . . . , DSP_N (N is a natural number equal to or greater than 2) in order to set an operating frequency of a random access memory 11. In this case, the N data size periods DSP_1, DSP_2, . . . , DSP_N correspond to different operating frequencies FREQ_1, FREQ_2, . . . , FREQ_N, respectively.

Each of the operating frequencies FREQ_1, FREQ_2, . . . , FREQ_N corresponding to each of the N data size periods DSP_1, DSP_2, . . . , DSP_N may be, for example, a value obtained by dividing a preset reference frequency by a specific coefficient. For example, the operating frequency FREQ_1 may be ⅒ of the reference frequency, and the operating frequency FREQ_2 may be ½ of the reference frequency.

In addition, when the size of the data accessed by the processor 13 from the random access memory 11 belongs to any one of the above-described N data size periods DSP_1, DSP_2, . . . , DSP_N, the system 10 may set the operating frequency of the random access memory 11 to an operating frequency corresponding to a target data size period.

As an example, in FIG. 10, it is assumed that the size of data accessed by the processor 13 from the random access memory 11 belongs to a second data size period DSP_2 among the N data size periods DSP_1, DSP_2, . . . , DSP_N. In this case, the system 10 may set the operating frequency of the random access memory 11 to an operating frequency FREQ_2 corresponding to the second data size period DSP_2.

As another example, it is assumed that the size of data accessed by the processor 13 from the random access memory 11 belongs to a first data size period DSP_1 among the N data size periods DSP_1, DSP_2, . . . , DSP_N. In this case, the system 10 may set the operating frequency of the random access memory 11 to an operating frequency FREQ_1 corresponding to the first data size period DSP_1.

Figure 11:
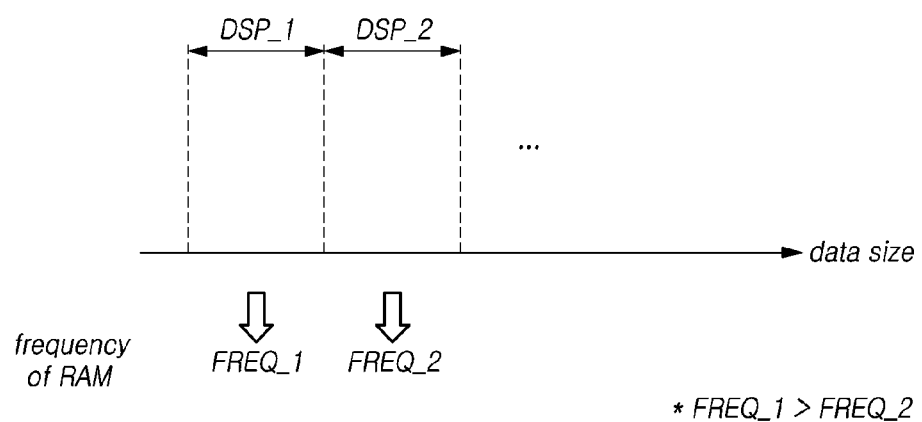
FIG. 11 illustrates an example of a relationship between a data size period and the operating frequency corresponding to the data size period described in FIG. 10.
Figure 12:
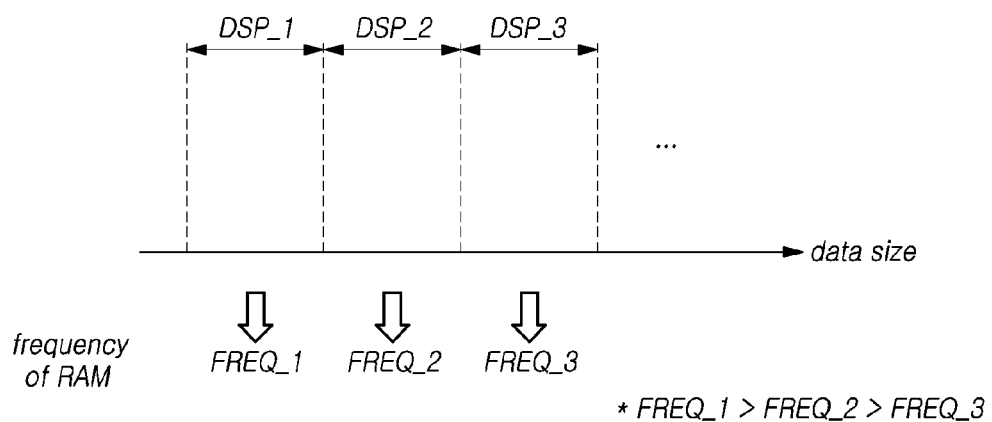
FIG. 12 illustrates another example of the relationship between the data size period and the operating frequency corresponding to the data size period described in FIG. 10.

FIGS. 11 to 12 illustrate examples of a relationship between a data size period and the operating frequency corresponding to the data size period described in FIG. 10.

First, referring to FIG. 11, a first operating frequency FREQ_1 corresponds to a first data size period DSP_1 and a second operating frequency FREQ_s corresponds to a second data size period DSP_2 among the N data size periods DSP_1, DSP_2, . . . , DSP_N.

In this case, the size of data included in the first data size period DSP_1 is smaller than the size of data included in the second data size period DSP_2. In addition, the operating frequency corresponding to the first data size period DSP_1 is lower than the operating frequency corresponding to the second data size period DSP_2.

That is, the operating frequency of the random access memory 11 becomes lower as the size of the data in the random access memory 11 that is accessed by the processor 13 becomes smaller, and the operating frequency of the random access memory 11 becomes higher as the size of data in the random access memory 11 increases.

In addition, referring to FIG. 12, the second operating frequency FREQ_2 corresponds to the second data size period DSP_2 among the N data size periods DSP_1, DSP_2, . . . , DSP_N, and the third operating frequency FREQ_3 corresponds to the 3 data size period DSP_3.

In this case, the size of data included in the second data size period DSP_2 is smaller than the size of data included in the third data size period DSP_3. In addition, the operating frequency corresponding to the second data size period DSP_2 is lower than the operating frequency corresponding to the third data size period DSP_3.

Accordingly, the size of data included in the first data size period DSP_1 is smaller than the size of data included in the third data size period DSP_3. In addition, the operating frequency corresponding to the first data size period DSP_1 is lower than the operating frequency corresponding to the third data size period DSP_3.

Figure 13:
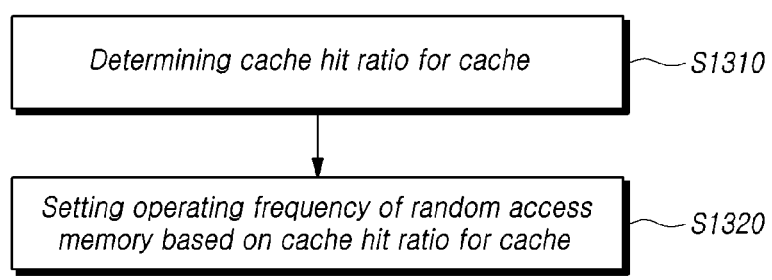
FIG. 13 illustrates an operating method of a system based on some embodiments of the disclosed technology.

FIG. 13 illustrates an operating method of a system 10 based on some embodiments of the disclosed technology.

Referring to FIG. 13, the operating method of the system may include determining a cache hit ratio for a cache 12 caching part of data stored in the random access memory 11 (S1310).

The operating method of the system 10 may include setting an operating frequency of the random access memory 11 based on the cache hit ratio determined at S1310 (S1320).

In this case, the operation S1320 may include, for example: determining a size of data in the random access memory 11 that is accessed by the processor 13 based on (1) a size of the data in the random access memory 11 or the cache 12 that is accessed by the processor 13, and (2) the cache hit ratio for the cache 12; and setting the operating frequency of the random access memory 11 based on the size of the data accessed in the random access memory 11 that is accessed by the processor 13.

In some implementations, the cache 12 included in the system 10 may include an L1 cache 21 and an L2 cache 22, and the cache hit ratio for the cache 12 may be determined by a cache hit ratio of the L1 cache 21 and a cache hit ratio of the L2 cache 22.

When the size of data in the random access memory 11 that is accessed by the processor 13 belongs to any one target data size period among a plurality of preset data size periods, the above-described operating frequency of the random access memory 11 may be set to an operating frequency corresponding to the target data size period.

In this case, for example, a first operating frequency may correspond to a first data size period among the plurality of data size periods and a second operating frequency may correspond to a second data size period among the plurality of data size periods. In addition, a size of data included in the first data size period may be smaller than a size of data included in the second data size period, and the first operating frequency may be lower than the second operating frequency.

Furthermore, a third operating frequency may correspond to a third data size period among the plurality of data size periods. In this case, the size of data included in the second data size period may be smaller than a size of data included in the third data size period, and the second operating frequency may be lower than the third operating frequency.

Figure 14:
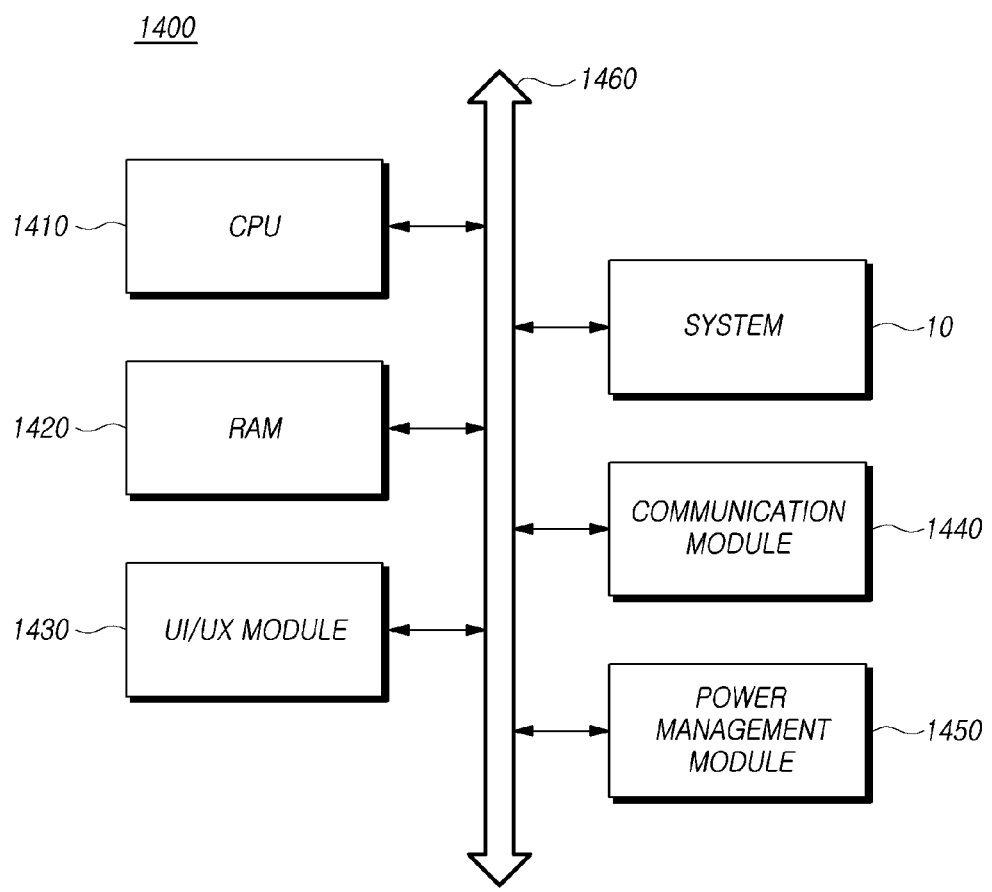
FIG. 14 illustrates an example configuration of a computing system based on some embodiments of the disclosed technology.

FIG. 14 is a diagram illustrating an example configuration of a computing system 1400 based on an embodiment of the disclosed technology.

Referring to FIG. 14, the computing system 1400 based on an embodiment of the disclosed technology may include: a system 10 electrically connected to a system bus 1460, a CPU 1410 configured to control the overall operation of the computing system 1400, a RAM 1420 configured to store data and information related to operations of the computing system 1400, a user interface/user experience (UI/UX) module 1430 configured to provide the user with a user environment, a communication module 1440 configured to communicate with an external device as a wired and/or wireless type, and a power management module 1450 configured to manage power used by the computing system 1400.

The computing system 1400 may be a personal computer (PC) or may include a mobile terminal such as a smartphone, a tablet or various devices.

The computing system 1400 may further include a battery for supplying an operating voltage, and may further include an application chipset, a graphic-related module, a camera image processor, and a DRAM. Other elements would be obvious to a person skilled in the art.

The system 10 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A solid state drive (SSD) storage device comprising:
 a random access memory structured to include memory cells to store data;
 a cache memory configured to cache at least part of the data; and
 a processor in communication with the random access memory and the cache memory to access at least part of the data in the random access memory or the cache memory,
 wherein the processor is configured to: determine a cache hit ratio for the cache memory;
 and set an operating frequency of the random access memory based on the cache hit ratio for the cache memory,
 wherein the SSD storage device determines a size of data in the random access memory that is accessed by the processor based on a size of data in the random access memory and the cache memory that is accessed by the processor and the cache hit ratio for the cache memory, and sets the operating frequency of the random access memory based on the size of the data in the random access memory that is accessed by the processor.

2. The SSD storage device of claim 1, wherein the processor is configured such that the cache hit ratio for the cache memory includes at least one of: during a preset time period, (1) a ratio of a size of data in the cache memory that is accessed by the processor to a total size of data in the random access memory or the cache memory that is accessed by the processor;
 (2) a ratio of a number of data accesses by the processor to the cache memory to a total number of data accesses by the processor to the random access memory or the cache memory; or (3) a ratio of a number of data accesses by the processor to the cache memory to a total number of data retrieves from the cache memory.

3. The SSD storage device of claim 1, wherein the cache memory comprises an L1 cache and an L2 cache, and the SSD storage device determines the cache hit ratio for the cache memory based on a cache hit ratio of the L1 cache and a cache hit ratio of the L2 cache.

4. The SSD storage device of claim 1, wherein, in a case that the size of the data in the random access memory that is accessed by the processor belongs to any one target data size period among a plurality of preset data size periods, the SSD storage device sets the operating frequency of the random access memory to an operating frequency corresponding to the target data size period.

5. The SSD storage device of claim 4, wherein a first operating frequency corresponds to a first data size period among the plurality of data size periods and a second operating frequency corresponds to a second data size period among the plurality of data size periods, and
 wherein a size of data included in the first data size period is smaller than a size of data included in the second data size period, and the first operating frequency is lower than the second operating frequency.

6. The SSD storage device of claim 5, wherein a third operating frequency corresponds to a third data size period among the plurality of data size periods, the size of data included in the second data size period is smaller than a size of data included in the third data size period, and the second operating frequency is lower than the third operating frequency.

7. A method of a solid state drive (SSD) storage device comprising:
 determining a cache hit ratio for a cache memory configured to cache at least part of data that is to be stored in a random access memory; and
 setting an operating frequency of the random access memory based on the cache hit ratio for the cache memory,
 wherein the setting of the operating frequency of the random access memory based on the cache hit ratio for the cache memory comprises:
 determining a size of data in the random access memory that is accessed by a processor based on a size of data in the random access memory and the cache memory that is accessed by the processor and the cache hit ratio for the cache memory; and
 setting the operating frequency of the random access memory based on the size of the data in the random access memory that is accessed by the processor.

8. The method of claim 7, wherein the cache hit ratio for the cache memory is determined based on at least one of: (1) a ratio of a size of data in the cache memory that is accessed during a preset time period to a total size of data in the random access memory or the cache memory that is accessed during the preset time period; (2) a ratio of a number of data accesses to the cache memory during the preset time period to a total number of data accesses to the random access memory or the cache memory during the preset time period, or (3) a ratio of the number of data accesses to the cache memory during the preset time period to a total number of data retrieves from the cache memory during the preset time period.

9. The method of claim 7, wherein the cache memory comprises an L1 cache and an L2 cache, and the cache hit ratio for the cache memory is determined based on a cache hit ratio of the L1 cache and a cache hit ratio of the L2 cache.

10. The method of claim 7, wherein, in a case that the size of the accessed data in the random access memory belongs to any one target data size period among a plurality of preset data size periods, the operating frequency of the random access memory is set to an operating frequency corresponding to the target data size period.

11. The method of claim 10, wherein a first operating frequency corresponds to a first data size period among the plurality of data size periods and a second operating frequency corresponds to a second data size period among the plurality of data size periods, and
wherein a size of data included in the first data size period is smaller than a size of data included in the second data size period, and the first operating frequency is lower than the second operating frequency.

12. The method of claim 11, wherein a third operating frequency corresponds to a third data size period among the plurality of data size periods, the size of data included in the second data size period is smaller than a size of data included in the third data size period, and the second operating frequency is lower than the third operating frequency.

* * * * *